US009197001B2

(12) United States Patent
Geitner et al.

(10) Patent No.: US 9,197,001 B2
(45) Date of Patent: Nov. 24, 2015

(54) STACKABLE CLAMPING CARRIER ELEMENTS FOR FLAT ASSEMBLIES

(75) Inventors: Manuel Geitner, Ursensollen (DE); Wolfgang Holmer, Schwandorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 244 days.

(21) Appl. No.: 13/643,150

(22) PCT Filed: Mar. 30, 2011

(86) PCT No.: PCT/EP2011/054925
§ 371 (c)(1), (2), (4) Date: Oct. 24, 2012

(87) PCT Pub. No.: WO2011/138092
PCT Pub. Date: Nov. 10, 2011

(65) Prior Publication Data
US 2013/0039698 A1 Feb. 14, 2013

(30) Foreign Application Priority Data
May 3, 2010 (DE) ......................... 10 2010 019 020

(51) Int. Cl.

| | |
|---|---|
| ***H01R 29/00*** | (2006.01) |
| ***H02B 1/056*** | (2006.01) |
| ***H01R 13/514*** | (2006.01) |
| ***H01R 9/24*** | (2006.01) |
| ***H01R 12/71*** | (2011.01) |
| ***H01R 12/72*** | (2011.01) |

(52) U.S. Cl.
CPC ............ *H01R 13/514* (2013.01); *H01R 9/2408* (2013.01); *H01R 12/716* (2013.01); *H01R 12/721* (2013.01); *Y10T 403/7045* (2015.01)

(58) Field of Classification Search
CPC .. H01R 12/716; H01R 12/721; H01R 13/514; H01R 9/2408; Y10T 403/7045
USPC ............... 403/361, 364; 439/43–46, 101, 102
See application file for complete search history.

(56) References Cited

U.S. PATENT DOCUMENTS

| | | | |
|---|---|---|---|
| 4,060,296 | A | 11/1977 | Kunkle et al. |
| 4,239,324 | A | 12/1980 | Stenz |
| 4,695,116 | A | 9/1987 | Bailey et al. |

(Continued)

FOREIGN PATENT DOCUMENTS

| | | | |
|---|---|---|---|
| CN | 101087046 | A | 12/2007 |
| DE | 1490197 | A1 | 12/1968 |

(Continued)

OTHER PUBLICATIONS

International Search Report PCT/ISA/210 for International Application No. PCT/EP2011/054925 dated Jun. 2011.

(Continued)

*Primary Examiner* — Michael P Ferguson
*Assistant Examiner* — Nahid Amiri
(74) *Attorney, Agent, or Firm* — Harness, Dickey & Pierce, P.L.C.

(57) ABSTRACT

A clamping carrier element for flat assemblies includes a housing. In at least one embodiment, the clamping carrier element is configured on the upper face of the housing in such a manner that a plurality of clamping carrier elements can be stacked one above the other via a connection technique.

8 Claims, 2 Drawing Sheets

(56) References Cited

U.S. PATENT DOCUMENTS

| | | | | |
|---|---|---|---|---|
| 5,176,523 | A | 1/1993 | Lai | |
| 6,116,959 | A | 9/2000 | Taylor | |
| 6,179,653 | B1 * | 1/2001 | Cheng et al. | 439/541.5 |
| 6,234,834 | B1 | 5/2001 | Tsai et al. | |
| 6,280,245 | B1 | 8/2001 | Han | |
| 6,361,355 | B1 | 3/2002 | Matsuoka et al. | |
| 6,524,130 | B1 * | 2/2003 | Yeh | 439/541.5 |
| 6,921,291 | B2 * | 7/2005 | Shih | 439/541.5 |
| 7,137,851 | B2 * | 11/2006 | Xue et al. | 439/668 |
| 7,563,111 | B2 | 7/2009 | Kinoshita et al. | |
| 8,187,029 | B2 * | 5/2012 | Yu et al. | 439/541.5 |
| 2006/0281362 | A1 | 12/2006 | Huang | |
| 2009/0130918 | A1 | 5/2009 | Nguyen et al. | |

FOREIGN PATENT DOCUMENTS

| | | | |
|---|---|---|---|
| DE | 1465160 | A1 | 4/1969 |
| DE | 2833313 | B1 | 9/1979 |
| DE | 8436267 | U1 | 3/1985 |
| EP | 1033786 | A2 | 9/2000 |
| EP | 1085608 | A1 | 3/2001 |
| EP | 1085608 | A1 | 3/2001 |
| GB | 762505 | A | 11/1956 |

OTHER PUBLICATIONS

Written Opinion of the International Searching Authority PCT/ISA/237 for International Application No. PCT/EP2011/054925 dated Jun. 2011.

German Search Report for German Application No. 10 2010 019 020.9 dated Oct. 22, 2010.

Priority Document German Application No. 10 2010 019 020.9 filed May 3, 2010.

Chinese Office Action and English translation thereof dated Jul. 1, 2014.

Second Chinese Office Action dated Dec. 19, 2014 in corresponding Chinese Application No. 201180022041.5.

Canadian Office Action dated Mar. 13, 2015 for corresponding Canadian Application No. 2,798,102.

European Office Action dated Sep. 7, 2015 for corresponding EP Application No. 11712240.8.

* cited by examiner

STACKABLE CLAMPING CARRIER ELEMENTS FOR FLAT ASSEMBLIES

PRIORITY STATEMENT

This application is the national phase under 35 U.S.C. §371 of PCT International Application No. PCT/EP2011/054925 which has an International filing date of Mar. 30, 2011, which designated the United States of America, and which claims priority to German patent application number DE 10 2010 019 020.9 filed May 3, 2010, the entire contents of each of which are hereby incorporated herein by reference.

FIELD

At least one embodiment of the invention generally relates to a clamping carrier element for flat assemblies having a housing.

BACKGROUND

During the production of flat assemblies, for example printed circuit boards with plug-in connections, such as plug-in connectors for example, the printed circuit boards are provided with the plug-in connectors and have any other components provided on the printed circuit board soldered to them in a solder bath in separate operations. This requires the plug-in connectors to be connected so firmly to the printed circuit board in the initial process, in other words in the first operation, that they retain their positions even during subsequent work and transport processes.

Generally the plug-in connector insulating units are fastened to the printed circuit board by way of screw or rivet connections in the region of the bearing and fastening flange. This secure and reliable manner of fastening plug-in connectors to printed circuit boards is however problematic, and complex operations are required if the plug-in connections are to be inserted and fastened to a printed circuit board in automatic manufacturing plants.

To this end DE 84 36 267 describes a manner of fastening plug-in connectors and their insulating units respectively to printed circuit boards. Provision is made here for metal journals to be inserted into the lateral flanges of the plug-in connectors. These journals are pressed into corresponding holes in the printed circuit board as the plug-in connector is assembled with the printed circuit board and initially bring about the fastening of the plug-in connector to the printed circuit board here. In a subsequent soldering operation the journals are soldered to the printed circuit board or to the metal surrounding the printed circuit board hole. With this embodiment of the fastening of the plug-in connectors to printed circuit boards it is however necessary for the journal and hole diameters to be matched as closely as possible to one another, so that the required clamping action is achieved in the hole. Also the distance between the printed circuit board holes and the distance between the fastening journals has to be complied with precisely, to allow the two parts to be joined with a close fit.

The growing need to accommodate an increasing number of electrical or electronic components of increasingly small dimensions on printed circuit boards means that there is a further requirement that the plug-in connectors can be used for different housing and/or device widths.

To this end DE 28 33 313 discloses a printed circuit board clamping block, in which the rear support plate serves solely as a mechanical retainer. Such printed circuit board clamping blocks can also have lateral support plates, providing the block with both lateral strength and mechanical retention in respect of the printed circuit board, to which the printed circuit board clamping block is connected.

It is further known with housings for electrical and/or electronic components, when only a single housing frame is used, for the number of connection points to be matched to requirements by using clamping bars as connecting elements, in a graduated arrangement, with connecting pins that can be soldered in. To connect the clamping bars to the actual printed circuit board, which is to be accommodated in the housing and holds the components in question, connecting printed circuit boards are provided. Such housings have no parts that are given a further electrical function in addition to their mechanical supporting and retaining functions.

SUMMARY

At least one embodiment of the present invention is therefore directed to a clamping carrier element for a flat assembly, which is configured individually for different printed circuit board thicknesses and adapted for the respective housing situation.

A clamping carrier element for a flat assembly includes a housing. The clamping carrier element is formed on the upper face of the housing in such a manner that a plurality of clamping carrier elements can be stacked one above the other by way of a connection technique.

Advantageous configurations and developments, which can be used individually or in combination with one another, are the subject matter of the dependent claims.

BRIEF DESCRIPTION OF THE DRAWINGS

Further advantages and embodiments of the invention are described below with reference to example embodiments and to the drawing, in which in schematic diagrams.

DETAILED DESCRIPTION OF THE EXAMPLE EMBODIMENTS

Figure 1:
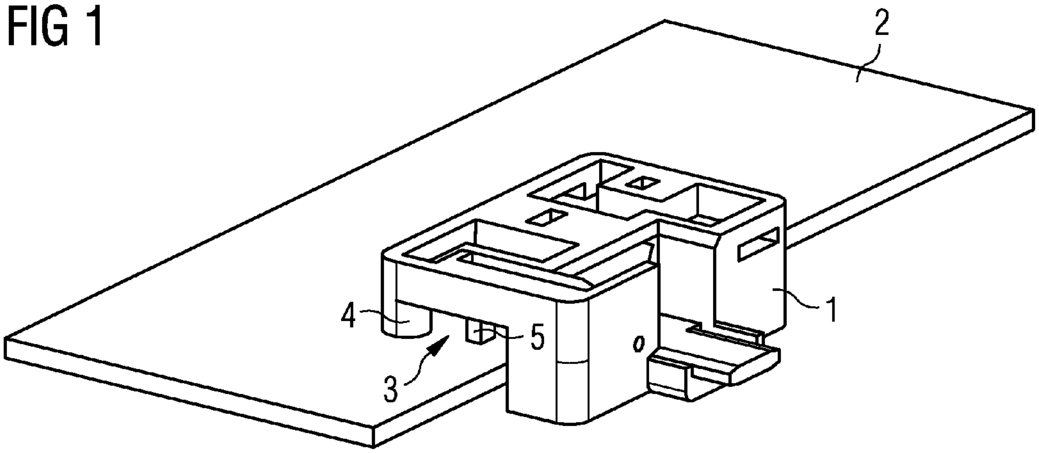
FIG. 1 shows a perspective view of an inventive clamping carrier element on a flat assembly.

A clamping carrier element for a flat assembly includes a housing. The clamping carrier element is formed on the upper face of the housing in such a manner that a plurality of clamping carrier elements can be stacked one above the other by way of a connection technique.

The individual clamping carrier elements are preferably configured as cuboidal, having an upper face, a lower face, a front face, a rear face and two side walls, and can be assembled in a modular manner to match different housing and/or device widths. The individual contacts, including the housing, can therefore be joined together in a sandwich structure. Provision is made according to at least one embodiment of the invention for the first contact carrier element to be able to be used for preferably 7.5 mm structural widths. The second contact carrier element disposed above it is preferably used for 15 mm structural widths and the third contact carrier element disposed above this can inventively be used preferably for 22.5 mm structural widths. This avoids the need for separate variants for the respective device widths. The inventive stackable clamping carrier elements of at least one embodiment therefore allow a significant variant reduction. They also significantly simplify the clamping carrier manufacturing process, as the clamping carriers no longer have to be adapted for the respective device widths. The inventive clamping carrier elements of at least one embodiment allow universal use for different device widths.

The stackable and insertable inventive clamping carrier elements can preferably be connected to one another by latching, plugging in or clamping. The latching mechanism requires a latching stud and a latching opening on the respective clamping carrier elements to be connected to one another, these then being connected to one another in this manner with a form fit. The plug-in mechanism is likewise a form-fit connection technique, in which a plug-in unit is inserted into an opening. The clamping operation is a force-fit connection technique, in which two units, in this instance the clamping carrier elements, are subjected to force.

In one particularly advantageous embodiment provision is made for the clamping carrier, which is disposed directly on the flat assembly, to have connecting pins on the lower face of the housing, the connecting pins having different cross sections over their length, which are configured to interact with holes of different cross section in a flat assembly. The connecting pins of the clamping carrier elements thus formed allow secure assembly on the flat assemblies, in particular printed circuit boards of different thickness, which can be for example 1.0 mm or 1.6 mm. This significantly simplifies the clamping carrier manufacturing process, as the clamping carriers no longer have to be adapted for the respective printed circuit board thickness. The inventive connecting pins allow universal use for printed circuit boards of different thickness.

It is also advantageous if the connecting pins are configured concentrically. Concentrically configured connecting pins allow simple positioning of the pins in the hole provided in the flat assembly. However the connecting pins can also have any other cross section shape.

It is particularly advantageous if positioning pins are disposed on the lower face of the housing of the clamping carrier element, which is disposed directly on the flat assembly. These positioning pins serve to align the clamping carrier on the flat assembly, thereby preventing incorrect positioning of the clamping carrier on the flat assembly.

It is also particularly advantageous if the connecting pins are disposed in a cutout on the lower face of the housing. This particular embodiment allows the flat assembly to be guided on the inner edge of the clamping carrier, thus providing a further positioning aid.

In one particularly advantageous embodiment provision is made for a contact interface for electrical contact to be configured on the housing of the clamping carrier element. Such a contact interface allows the electrical contact to branch to other regions of an electrical device.

It is also advantageous if the flat assembly, which holds discrete components on a board, is preferably configured as a printed circuit board, which serves as a two-dimensional flat circuit holder and can be connected electrically or mechanically to form a functional unit.

The inventive stackable clamping carrier elements of at least one embodiment, on the one hand, allow secure assembly on flat assemblies, in particular on printed circuit boards of different thicknesses, and on the other hand allow individual adaptation for the respective housing situation. Associated with this is a significant simplification of the clamping carrier manufacturing process, as the clamping carriers no longer have to be adapted for the respective printed circuit board thickness or the respective housing situation. The inventive clamping carrier elements of at least one embodiment allow individual use for printed circuit boards of different thickness and also for housings of different widths.

FIG. 1 shows an inventive clamping carrier element 1, which is disposed on a flat assembly 2, in particular a printed circuit board. Disposed in a cutout 3 disposed on the lower face of the clamping carrier element 1 are connecting pins 4, which have different cross sections over their length and are preferably configured concentrically. These graduated connecting pins 4 can be configured as domed, square or longitudinal journals. The connecting pins 4 interact with holes in the flat assembly 2 or are inserted into them. Positioning pins 5 are also disposed on the lower face in the cutout 3, facilitating the alignment of the clamping carrier element 1 with the flat assembly 2.

Figure 2:
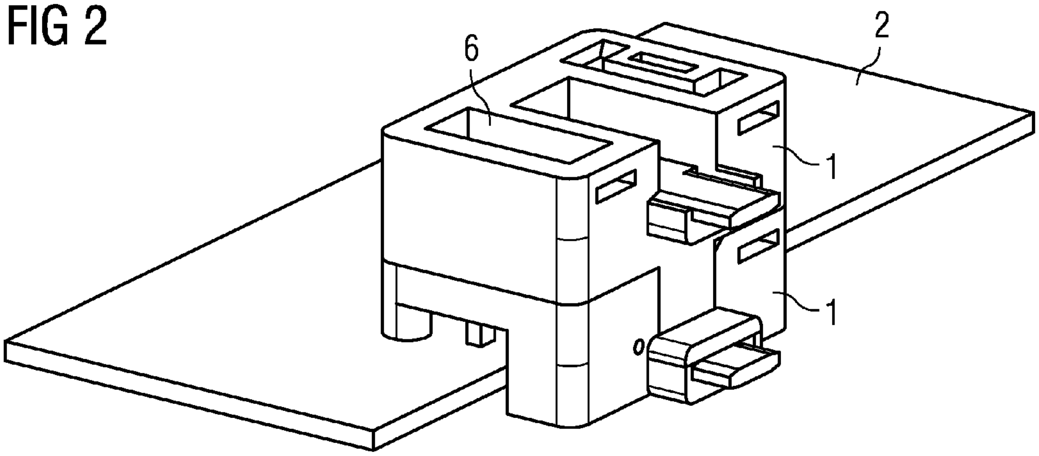
FIG. 2 shows a perspective view of two inventive clamping carrier elements joined inside one another.

FIG. 2 shows two clamping carrier elements 1 joined inside one another and disposed on a flat assembly 2. The preferably cuboidal housings of the contact carrier elements 1 have further cutouts 6 on their upper faces, which are configured for a latching, clamping or plug-in operation.

Figure 3:
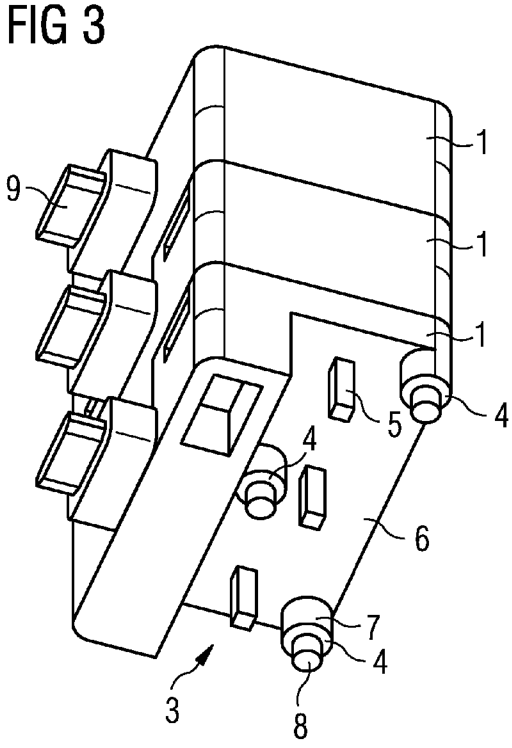
FIG. 3 shows a perspective view from below of three clamping carrier elements with connecting pins joined inside one another.

FIG. 3 shows three clamping carrier elements 1 joined inside one another and viewed from below. The clamping carrier element 1 preferably has three connecting pins 4, which are disposed in the cutout 3 on the lower face 6 of the clamping carrier element 1. The connecting pins 4 are configured as graduated; in other words in a region 7 of the connecting pins 4 directly on the lower face 6 of the clamping carrier element 1 they have a larger cross section than in the end region 8 of the connecting pins 4. The connecting pins 4 are preferably configured concentrically and can be in the form of a domed, square or longitudinal journal. Also present on the lower face 6 of the clamping carrier element 1, in addition to the connecting pins 4, are positioning pins 5, which are preferably configured as square and do not have different cross sections over their length. The clamping carrier element 1 also has a contact interface 9 in the form of a contacting tongue, which serves as an electrical interface for other contact elements.

Figure 4:
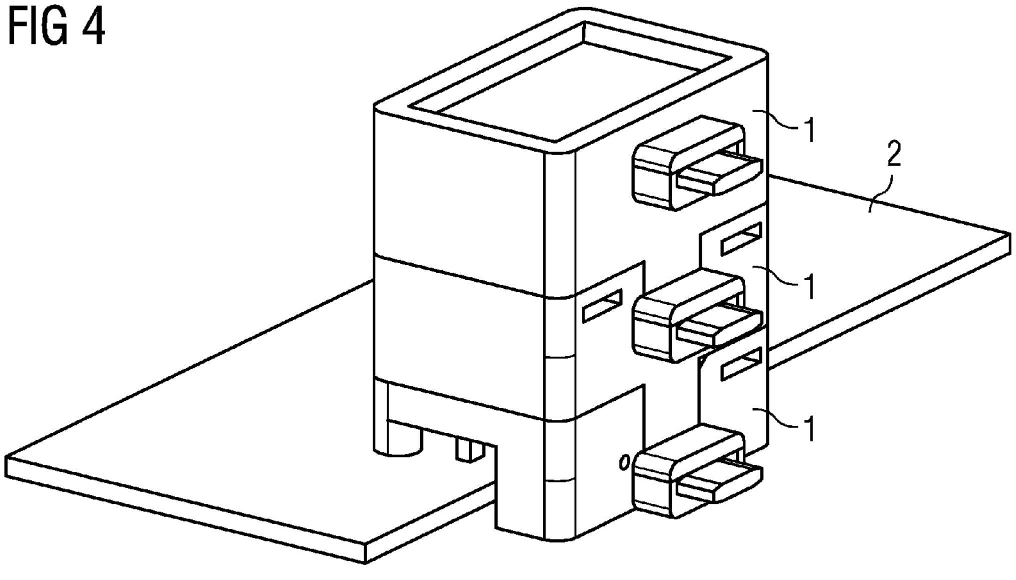
FIG. 4 shows a perspective view of three clamping carrier elements disposed one above the other on a flat assembly.

FIG. 4 shows three clamping carrier elements 1 disposed one above the other on a flat assembly 2.

The inventive stackable clamping carrier elements of at least one embodiment on the one hand allow secure assembly on flat assemblies, in particular on printed circuit boards of different thicknesses, and on the other hand allow individual adaptation for the respective housing situation. Associated with this is a significant simplification of the clamping carrier manufacturing process, as the clamping carriers no longer have to be adapted for the respective printed circuit board thickness or the respective housing situation. The inventive clamping carrier elements allow individual use both for printed circuit boards of different thickness and also for housings of different widths.

The invention claimed is:

1. A clamping carrier element for a flat assembly, comprising:
- a first housing including,
  - an upper face,
  - a lower face,
  - a side face connecting the lower face to the upper face, and
  - a contact interface projecting from the side face, the contact interface being configured to serve as an electrical interface for external contact elements, the lower face including at least one first cutout that contains connecting pins configured to interact with holes in the flat assembly to connect the first housing to the flat assembly, the at least one first cutout allowing for a portion of the first housing to hang over an outer edge of the flat assembly such that an entire length of a lowermost surface of the side face is below an uppermost surface of the flat assembly, the upper face including at least one second cutout configured to engage with connecting pins of a second housing to connect the first housing to the second housing in a stackable manner wherein the first housing includes a recess formed in the upper face and the side face, the contact interface protruding from the side face at a bottom surface of the recess, the recess being configured to engage with a protrusion of the second housing in the stackable manner; and wherein the contact interface is a male electrical connector for connecting to corresponding female electrical connectors of the external contact elements.

2. The clamping carrier element of claim 1, wherein one of the first and second housings includes a latching stud and the other of the first and second housings includes a latching opening such that the first and second housings are latchable into one another via a latching operation.

3. The clamping carrier element of claim 1, wherein one of the first and second housings includes a plug-in unit and the other of the first and second housings includes an opening such that the first and second housings are plugable into one another via a plugging operation.

4. The clamping carrier element of claim 1, wherein the first and second housings include clamping units such that the first and second housings are clampable to one another via a clamping operation.

5. The clamping carrier element of claim 1, wherein the connecting pins include different cross sections over their length and the holes have different cross sections in the flat assembly.

6. The clamping carrier element of claim 5, wherein the connecting pins are configured concentrically.

7. The clamping carrier element of claim 6, wherein positioning pins are disposed on the lower faces of the first and second housings.

8. The clamping carrier element of claim 5, wherein positioning pins are disposed on the lower faces of the first and second housings.

* * * * *